(No Model.) 3 Sheets—Sheet 2.

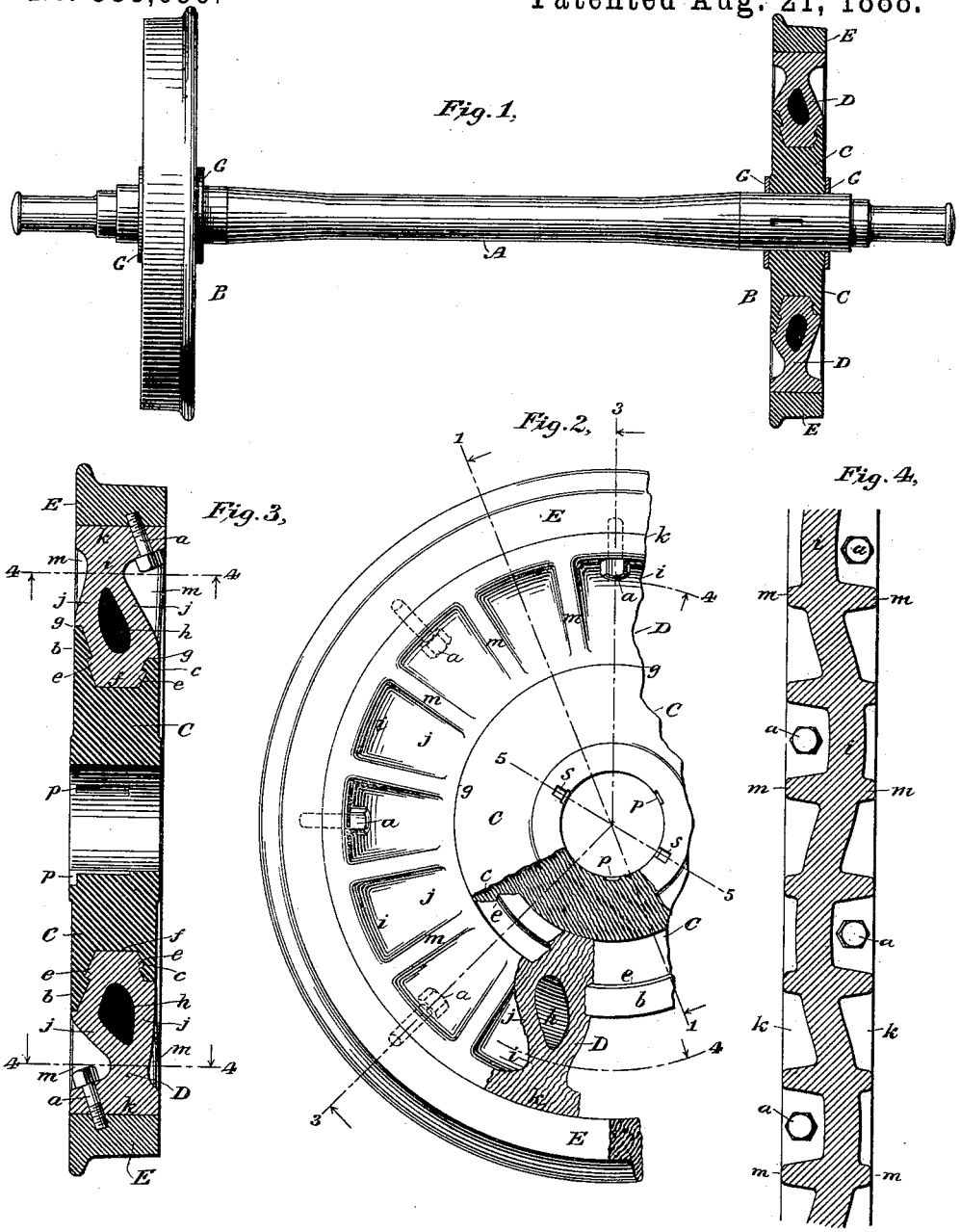

J. N. WEIKLY.
CAR WHEEL.

No. 388,096. Patented Aug. 21, 1888.

WITNESSES:
Geo. W. Breck.
John A. Rennie.

INVENTOR:
James N. Weikly,
By his Attorneys,
Arthur C. Fraser & Co.

(No Model.) 3 Sheets—Sheet 3.

J. N. WEIKLY.
CAR WHEEL.

No. 388,096. Patented Aug. 21, 1888.

WITNESSES:
Geo. W. Breck
John A. Rennie

INVENTOR:
James N. Weikly,
By his Attorneys,
Arthur C. Fraser & Co.

UNITED STATES PATENT OFFICE.

JAMES N. WEIKLY, OF PHILLIPSBURG, NEW JERSEY.

CAR-WHEEL.

SPECIFICATION forming part of Letters Patent No. 388,096, dated August 21, 1888.

Application filed September 6, 1887. Serial No. 248,936. (No model.)

*To all whom it may concern:*

Be it known that I, JAMES N. WEIKLY, a citizen of the United States, residing at Phillipsburg, Warren county, New Jersey, have invented certain new and useful Improvements in Car-Wheels, of which the following is a specification.

The object of this invention is to produce a wheel for railway cars or locomotives which shall be free from the defects inherent in the wheels now made. To this end I construct the wheel with a removable tire and with a center which is constructed in such substantial manner as to be practically indestructible, in order that it may outwear several tires, and I unite the wheel center to the axle in such manner that it cannot become loose thereon nor twist or work out of its proper place.

Figure 5:
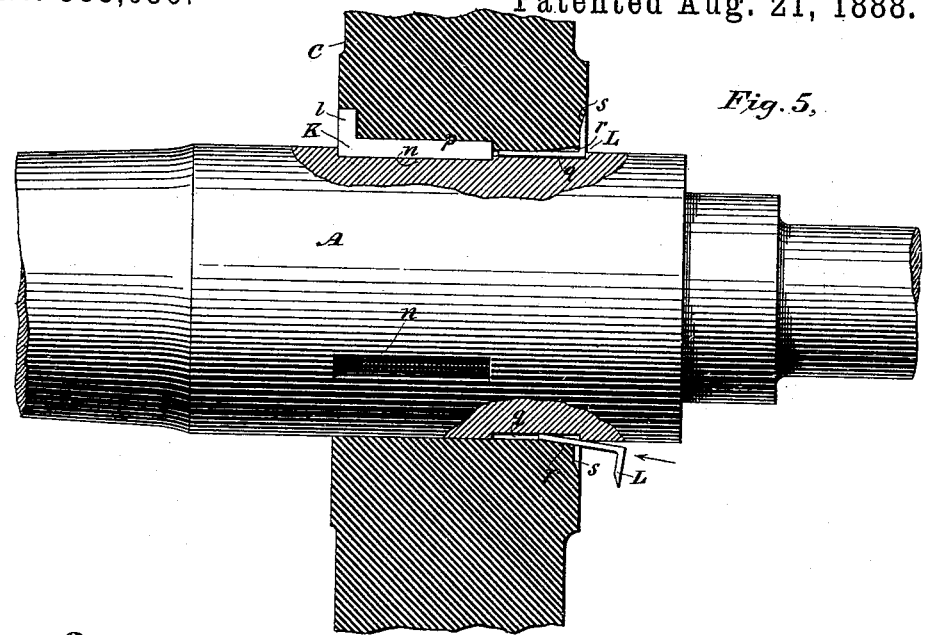
Figure 6:
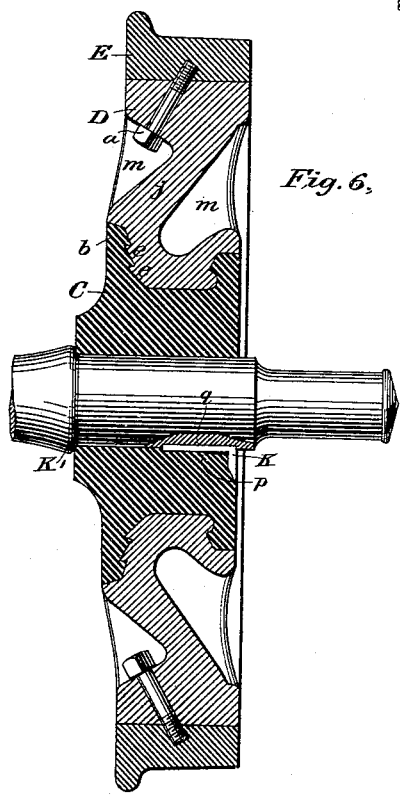
Figures 7, 8, 9:
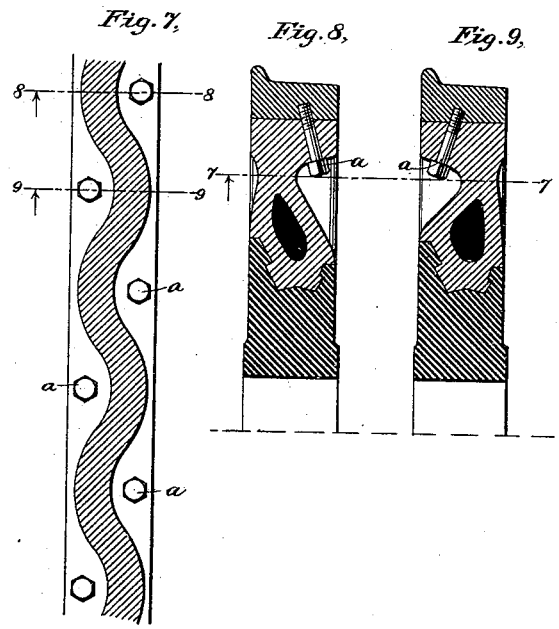
Figure 10:
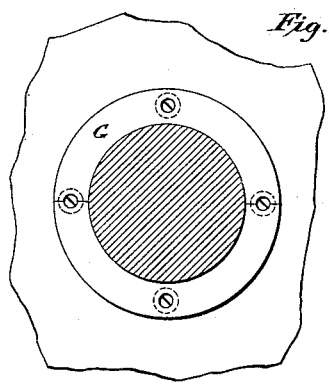
Figure 11:
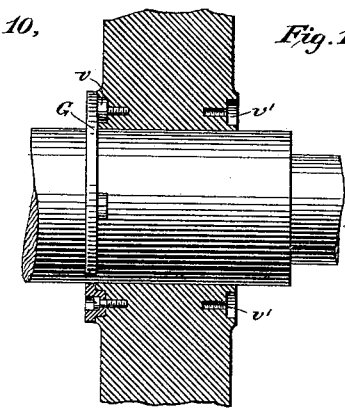
Figure 12:
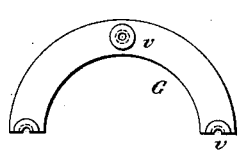
Figure 13:
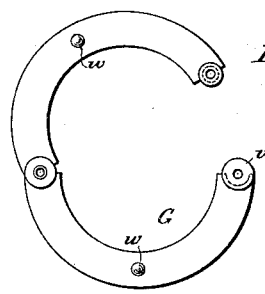
Figure 14:
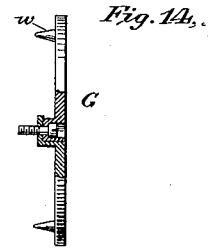

Figure 1 of the accompanying drawings is a front elevation of an axle and wheels constructed according to my invention, one of the wheels being in diametrical section cut in the plane of the line 1 1 in Fig. 2. Fig. 2 is a fragmentary side elevation of the wheel on a larger scale, partially broken away to show the construction. Fig. 3 is a radial section of the wheel in two planes, as denoted by the line 3 3 in Fig. 2. Fig. 4 is a section cut cylindrically, as denoted by the lines 4 4 in Figs. 2 and 3, and looking outwardly from the center, the view being a development in a straight line, or what is commonly known as a "stretch-out." Fig. 5 is a fragmentary elevation of the axle and fragmentary section of the hub of the wheel, cut in the plane of the line 5 5 in Fig. 2. The remaining figures illustrate modifications. Fig. 6 is a diametrical section of a car-wheel of the usual proportions embodying one form of my invention. Figs. 7, 8, and 9 are sectional views of another construction, which is very similar to that shown in Figs. 2, 3, and 4. Fig. 7 is a stretch-out similar to Fig. 4, cut in the plane of the line 7 7 in Figs. 8 and 9. Fig. 8 is a radial section cut in the plane of the line 8 8 in Fig. 7, and Fig. 9 is a similar view cut in the plane of the line 9 9 therein. The remaining views illustrate another feature of my invention. Fig. 10 is a transverse section of the axle with a fragment of the hub, showing a lubricating-washer applied thereto. Fig. 11 is a side elevation of a fragment of the axle, the hub being shown in diametrical section. Fig. 12 is a rear view of one of the halves or fragments of the washer. Fig. 13 is a rear view of a hinged washer detached; and Fig. 14 is a side elevation thereof, partly in section, through the fastening.

Let A designate the axle, and B B the wheels as a whole. I prefer to make the axle much larger where it passes through the wheels than is customary, as clearly shown in Fig. 1. The wheel is constructed of a solid wrought-iron hub, C, a cast-iron outer portion or felly, D, and a wrought tire, E, preferably of rolled steel. The parts C and D are united permanently together and constitute the "wheel-center." The rim of this wheel-center is finished off exteriorly to a true cylinder, and the tire is turned out cylindrically to form a very tight fit therewith, whereupon the tire is forced onto the rim by hydraulic pressure, in the same manner that car-wheels are commonly forced onto their axles. The parts should be by this means so tightly fitted together that no transverse shocks to which the wheel may be subjected in use will loosen the tire or force it off. To guard against any loosening of the tire in use, and also to provide against the contingency of the bursting of the tire, screws *a a* are inserted through the rim of the wheel and into the tire. These screws are inserted at an angle, and take into the tire a short distance at a point near the middle thereof. They are inserted from alternately opposite sides of the rim, as shown in Figs. 2 and 3. These screws not only prevent any lateral displacement of the tire in case it should become loose, but in the event of its bursting into fragments or cracking transversely they will hold it in place for a reasonable time, thereby preventing accident and enabling the wheel to be run without delaying the train until a convenient place is reached where it can be replaced.

The tire is made thick, so that as it becomes worn by the rail the wheel may be placed in a lathe and the tread of the tire turned off sufficiently to cut away the worn portion and afford a new wearing-surface. The tire may thus be alternately worn down and turned off several times successively until it is so far reduced in thickness that it can no longer be used with safety. It has then to be replaced. This is done by withdrawing the screws *a a* sufficiently to free them from the tire and then forcing off the tire in a hydraulic press. A new tire, with corresponding screw-holes, is then forced on, and the screws are screwed in to engage it. The tires may be tapped to gage before being forced onto the wheel-center, or they may be tapped through the screw-holes after being forced on, as may be preferred.

Car-wheels as heretofore made have not possessed sufficient endurance or durability to outwear several successive tires, and although some wheels with removable tires have been devised, they have not come into use because of their expensive and impracticable construction and the inherent weakness of their centers, which burst or otherwise break down or become useless before a second tire is worn out. I construct the wheel-center with such strength and rigidity that it becomes practically indestructible in ordinary use, so that it will outwear not only several tires but also several axles, whereby an enormous saving is effected.

The wheel-center is constructed of the solid forged hub C and the outer portion or felly, D, which is of cast-iron, and is welded to the hub in the process of casting. The hub is made of solid wrought-iron with an inside flange, $b$, and an outside flange, $c$, both of which project outwardly to a considerable distance from the central bore. Between these flanges is a peripheral groove or depression the sides of which, formed by the respective flanges, are made with overhangs or undercut portions $e$ $e$. The cast-iron felly is cast into this peripheral groove, and the cast metal flows under the overhangs $e$ $e$, so that it becomes intimately interlocked therewith, thereby forming a dovetailed joint, by means of which the two parts of the wheel-center are so firmly united that their separation becomes impossible. The wrought hub is heated to a welding heat and placed in the mold in which the felly D is to be cast, and the molten iron is run in around it, whereby the cast and wrought iron portions of the wheel-center are welded together at their joints in a manner well understood in the art. The wrought iron or steel tires of car-wheels have heretofore been united to the cast-iron center by a weld of this character. So, also, has a tubular central bushing been united to the cast-iron wheel; but, so far as I am aware, the two parts of a composite wheel-center have never been united in this manner prior to my invention. By sinking the one part deeply into the other at their joints I provide an extensive welding-surface, which insures the intimate and permanent union of the two metals. The interlocking or dovetailing of the two together not only increases the strength of the joint, but also serves to prevent any separation of the metals by unequal contraction in cooling, thus insuring a perfect and permanent weld.

The felly D is of the same width as the hub C at its junction therewith, in order that it may have a broad seat or bearing thereagainst, and thereby most effectually resist tilting strains. The direct strain due to the weight of the car, which is transmitted through the wheel in a downward direction to the rail, is resisted by the flat seating of the felly against the cylindrical bottom $f$ of the joint, and also by the similar seatings at $g$ $g$, where the cast-iron rests against the peripheries of the flanges $b$ and $c$. The flange $b$ on the inner side of the wheel is made of greater diameter than the outer flange, $c$, so that it projects farther beyond the bottom of the intervening groove or seating. This is in order to more effectually strengthen and brace the cast-iron portion against the lateral strains due to impact of the flange of the wheel against the rail. In resisting such strains the felly acts as a lever, having its fulcrum against the flange $b$ and exerting an outward thrust against the flange $c$. The depth of the peripheral groove or socket in the hub, within which the cast-iron felly is seated, is so great that the portion of the cast-iron felly which is subject to the greatest strain due to this tilting tendency is housed or embraced between the wrought-metal flanges, and is thereby protected and relieved to the greatest extent possible from strain of this character.

The felly D (by which name I designate the cast-iron portion of the wheel-center) is constructed, preferably, in the manner shown in Figs. 2, 3, and 4. At its broad base, where it joins the wrought-metal hub, it is lightened by being cored out or made with a core or hollow space, $h$, around which the web extends on both sides of the wheel, reuniting at $i$ just inside of the rim $k$. The inclined portions $j$ $j$ of the web on opposite sides of the core serve to impart the necessary stiffness for resisting lateral or twisting strains. The outer portion, $i$, of the web is made of a waving or sinuous section, as most clearly shown in Fig. 4—that is to say, at successive points around the periphery it joins the rim $k$, sometimes close to the inner side thereof, as shown in the upper part of Fig. 3, at other times close to the outer side thereof, as shown in the lower part of Fig. 3, and at intermediate points it joins the rim at the middle thereof, as shown in Fig. 1. This construction effectually braces the wheel against transverse strain on the principle of the arch, and is also effective in reducing any strain to the metal which may be due to its contraction in cooling. This waving of the web necessitates a continual change in shape and inclination of the divided webs $j$ $j$ and core $h$, so that the wheel in its rotation receives the strains due to its load and to transverse shocks against the rail in directions that are to a certain extent undergoing constant change, whereby the deterioration by molecular disintegration is retarded.

On opposite sides of the web are formed perpendicular radial ribs $m$ $m$, which serve to support the rim $k$ and to stiffen and brace the cast-iron portion of the wheel. The ribs on the opposite sides coincide with one another in position, the two ribs of each pair being arranged in a plane intersecting the web, as shown in Fig. 4. I prefer to make these ribs straight and radial, the only objection to which is that in some instances difficulty may be found in casting them, owing to their contraction; but they are so much shorter than such ribs as heretofore applied to car-wheels that little if any difficulty from this source is to be anticipated. If preferred, however, they may be made more or less tangential and be somewhat curved.

The waving or sinuous contour of the web has an important advantage in enabling the screws $a$ $a$ to be passed through the rim and into the tire from alternately opposite sides of the wheel. If the web were straight and in the plane of the middle of the rim, there would not be sufficient room on either side of it for the convenient entering of a screw unless the latter were made of such small size as to be practically useless, except a great number of them were employed, entering the tire at close intervals, which would be unduly expensive. By the waving of the web from side to side extra space is acquired on alternately-opposite sides for the insertion of the screws, as clearly seen in Fig. 4. The radial ribs $m$ $m$ are arranged on both sides of the wheel directly opposite each other and at such intervals as will leave openings or pockets of sufficient width to leave ample room around the screw-head for the insertion of a wrench to manipulate it.

Car-wheels as heretofore made have necessarily had their hubs project inwardly to a considerable distance beyond the plane of the tire in order to afford a long bearing upon the axle for resisting the transverse shocks due to the contact of the flange with the rail. This long bearing was necessary because of the inherent weakness of the inner portion of the wheel, which rendered it incapable of resisting with certainty such a tilting strain unless it were reduced by disposing the material in an oblique direction in order that it might oppose it more nearly in the line of the strain. My invention renders such an inward prolongation of the hub unnecessary, since by making the hub solid and of wrought-iron and by giving it a radial thickness around the bore nearly if not quite as great as its lateral thickness it is enabled to effectually resist any lateral strains to which the wheel may be subjected without necessarily prolonging it inwardly beyond the plane of the tire. I prefer to construct the wheel with its hub in nearly if not quite the same plane as the tire, as shown in Fig. 3. This construction has the important advantage that it enables the wheel to be used in connection with the "safety-frame" claimed in my application for patent for improvements in the running-gear of railway-cars.

The wheel is united to the axle by being forced thereon by hydraulic pressure in the usual way. In addition thereto it is keyed to the axle in such manner as to prevent any possibility of its twisting thereon or of becoming displaced along the axle. The loosening of car-wheels upon their axles is a frequent source of railway accidents, since upon the loosening of the wheel it will slide inwardly and lose its gage and thereby become derailed. The twisting strain upon the wheels in rounding curves is the most usual cause of loose wheels. By my method of keying the wheel to the axle this twisting strain is positively resisted, whereas as heretofore constructed this strain has only been resisted by the frictional adherence of the wheel to the axle. The keying is best shown in Fig. 5. The enlarged axle has three or other suitable number of keyways, $n$ $n$, cut in it longitudinally, and in these are seated the keys, one of which is shown at K, their length being equal to that of the keyways. The hub of the wheel is formed with corresponding keyways, $p$ $p$, as shown in Fig. 3. These keyways extend, preferably, about two thirds through the wheel, from the inner to the outer side thereof, and at the inner side thereof each keyway is extended radially outward to form a pocket for the head $l$ of the key. The keys being placed in the keyways $n$ and fitted tightly or otherwise secured firmly therein, so that they shall not fall out, the wheel is forced onto the axle from the outer side of the latter in such position that its keyways $p$ $p$ shall correspond with the keys, so that the keys enter these keyways, and the wheel is forced over them until the inner side of the hub is flush with the heads of the keys, so that the latter are embedded in the wheel. The wheel is thus prevented both from twisting and from moving farther inward, the latter displacement being prevented by the abutment of the wheel against the heads of the keys and by the abutment of the latter against the inner ends of their keyways $n$ $n$. When the axle becomes worn out and has to be renewed, the wheel is forced off in the contrary direction, thereby freeing it from the keys. With the ordinary construction of car-wheel and axle it would not be feasible to key the wheel to the axle, since the axle would be unduly weakened by the cutting of keyways in it, and the strength of the hub would also be impaired beyond the limit of safety, especially so when mode of cast-iron, as is usual. My improved construction of wheel enables the hub to be bored out larger, and hence admit of an enlarged axle being used, and the increased strength both of axle and hub, due to the enlargement of the former and to the making of the latter solid and of wrought-iron, enables keyways to be cut in both without weakening either.

There is a slight tendency for a loose wheel to become displaced outwardly; but this tendency is very slight, owing to the fact that no direct thrust is exerted against it in that direction, so that in no case can the outward tendency be greater than that of the weight of the wheel. To prevent displacement of the wheel in this direction, I provide some light keys, L L—two, by preference—which are driven into place after the wheel is forced on. A keyway, $q$, is cut in the axle extending from the outer face of the wheel inwardly about one-third the diameter of the hub. In a position corresponding thereto the hub is formed with a bevel, $r$, and on its exterior face with a radial recess, $s$, to fit the head of the key L. The key is of spring-steel, and is driven in the manner indicated at the lower side of Fig. 5 until its advancing end enters to the farther end of the keyway and its head enters the recess $s$, whereupon its elasticity causes it to spring inwardly with its head seated against the outer end of the keyway, as shown at the upper side of Fig. 5. The stiffness and strength of the head of the key are sufficient to enable it, after bridging the notch $r$, to exert a sufficient pressure against the wheel to prevent the slipping off of the latter should it become loose. When it is desired to remove the wheel, the head of the spring-key L is cut off with a cold-chisel, whereupon the key offers no further resistance to the forcing off of the wheel, and after the removal of the latter the body of the key, which is lying in the keyway $q$, is extracted therefrom and thrown away.

Fig. 6 illustrates a modification of my invention, the wheel here illustrated being adapted to the usual standard proportions of axle, since its hub projects inwardly to the extent that is usual in car-wheels and has a bore of the usual small diameter. The axle here shown is of the usual construction and dimensions, except that it is provided with a shoulder, K', against which the inner side of the wheel-hub is seated in order to prevent any displacement of the wheel inwardly upon the axle in case it should become loose thereon. To this extent this shoulder is the equivalent of the headed keys K K, previously described. I have shown the key L in this figure arranged to prevent the outward displacement of the wheel. Instead of being seated wholly in a keyway, $q$, in the axle, as before, it is made somewhat thicker and enters for about half its thickness, also, a keyway, $p$, in the hub, in order to serve also to prevent the twisting of the wheel on the axle. This view also illustrates a modification of the wheel-center. The cast-iron felly is not cored and has only one inclined web, $j$, which is inclined at a uniform angle, as shown, being approximately the segment of a hollow cone. The hub C has its inner flange, $b$, formed with two under-cuts or overhanging shoulders, $e\ e$, for engagement with the cast-iron. All of the screws $a\ a$ are inserted from the inner side, as shown at the bottom in Fig. 6. Thus the features of my invention which involve the sinuous curving of the web and the alternation of the screws on opposite sides are omitted in this construction.

If the sinuously-curved web be employed, the ribs $m\ m$ may be wholly omitted, as in the construction shown in Figs. 7, 8, and 9. In this construction the sinuous web curves from one side to the other in curves of shorter radius than in the construction first described, so that the rim is braced and supported at both sides at frequent intervals. A tire-screw, $a$, may be inserted at each corrugation of the web, as shown.

Figs. 10 to 14 illustrate another feature of my invention. The opposite faces of the hub of the wheel constitute thrust-bearings for relieving the brass or bearing cap in the axle-box from lateral wear, according to the method fully disclosed in my said other application for patent. In order to avoid undue wear and friction at these thrust-bearings, I provide for their lubrication by facing them with washers of anti-friction metal. Figs. 10 and 11 illustrate the portion of the hub of the wheel thus faced with anti-friction washers. The washer G is divided into two parts in order that it may be applied over the axle. This is essential for the washer against the inner face of the hub, and is preferable, but not essential, for that applied against the outer face. The washer is secured to the hub by screws or otherwise, the screws or other fastenings being so countersunk as to be protected from wear, even in case the washer were to be worn entirely through. To this end the washer is provided with bosses $v\ v$ on its side toward the hub, and these bosses enter sockets $v'\ v'$, formed in the hub. The holes for the screw-heads are deeply countersunk into the bosses, as clearly shown. Two or more screws may be used. It is preferable to make the joint between the two halves of the washer to extend through one of the bosses on each side, in order that the same screws may serve for fastening both halves. The washer may either be diametrically divided into two entirely distinct halves (shown in Figs. 10, 11, and 12) or the halves may be hinged together, as shown in Fig. 13. In the latter construction the fastening-screws are passed through ears at the bottoms of the bosses $v$, these ears overlapping in the manner shown in Fig. 14. Two screws will suffice—one at the hinge and one diametrically opposite. In this case it is preferable to provide the washer with dowels $w\ w$, which will enter corresponding sockets drilled into the hub. In either construction but very little of the metal of the hub is cut away and the hub is not materially weakened. In the case of wheels to be mounted in the ordinary manner, such as shown in Fig. 6, a washer on the outer side alone will suffice, as it is only on this side that the wheel bears against the box.

The improved wheel provided by my invention is not only much more durable than ordinary wheels, or even the best and most expensive wheels heretofore made, but it has the additional advantage of being able to carry greatly-increased loads. The tendency in railway management at the present time is in the direction of increasing the capacity of railway-cars, both passenger and freight. This necessarily throws a greater weight upon the wheels and axles, which at present are the weakest members of the entire system, and the strength of which constitutes an absolute limit to the capacity that can be given to the rolling-stock.

Thus the adoption of my invention will enable the carrying capacity of a railroad to be greatly increased. Its advantages are also apparent in the freedom from accidents due to bursting or breakage of the wheel, the loosening of the wheel on the axle, or other casualties attributable to inherent weakness in the wheels, and in the economy resulting from the utilization of the wheel-center—which in a durably-constructed wheel is the most expensive portion—to wear out several successive tires and axles, which are the only portions actually subject to wear.

In the construction of car-wheels according to my invention any metals or materials which are known or recognized in the art as the substantial equivalents of those which I have herein specified may be substituted for them. For example, wrought-iron may be substituted for rolled steel as the material for the tire, and cast-steel may be substituted for wrought-iron as the material for the hub, or the hub may be made of any metal of sufficient rigidity and toughness. It should not be made of a hard and brittle material—such as cast-iron. The proportions may be varied to some extent; but in any event the hub C should be made very thick and solid. If it is reduced to the dimensions of a mere bushing it will have departed from what is essential for this part of my invention.

I claim as my invention the following-defined improvements in car-wheels and their accessories, substantially as hereinbefore specified, namely:

1. A car-wheel consisting of a wheel-center having a rim with its periphery cylindrical and of uniform diameter from side to side, combined with a tire fitted over said rim, and screws for fastening said tire passed through said rim from opposite sides of the web.

2. A car-wheel constructed of three parts—a wrought-metal hub, a removable tire, and an intervening felly of cast metal welded to said hub and formed with a radially-corrugated web of sinuous contour at its junction with the rim.

3. A car-wheel constructed with a web having an annular hollow or core around its hub, and formed with a radially-corrugated web of sinuous contour having its greatest sinuosity at its junction with the rim, and the corrugations diminishing continuously thence toward the hub.

4. A car-wheel constructed with a radially-corrugated web of sinuous contour at its junction with the rim and with radial ribs projecting to opposite sides of the web, and those on the opposite sides arranged to coincide with one another in planes intersecting the web.

5. A car-wheel constructed with a radially-corrugated web and with radial ribs projecting therefrom at intervals on opposite sides thereof, whereby pockets of varying depth are formed against the rim on both sides of the wheel, with screws passed through the rim in the deeper pockets, and a removable tire fitted to said rim and secured by said screws.

6. A car-wheel consisting of a removable tire, combined with a wheel-center formed of a solid hub of forged or wrought metal and an outer portion or felly of cast metal welded to said hub.

7. A car-wheel constructed with a wheel-center formed of a solid hub of wrought metal having a deep peripheral groove and an outer portion or felly of cast metal cast into said groove and forming a welded joint therewith, whereby the two parts of the wheel-center are united permanently and by a weld of extensive surface.

8. A car-wheel constructed with a wheel-center formed of a solid hub of wrought metal having a deep peripheral groove, the sides of which are undercut, and an outer portion or felly of cast metal cast into said groove, whereby the two parts of the wheel-center are united by means of a dovetailed connection.

9. A car-wheel constructed with a wheel-center formed of a solid hub of wrought metal having projecting flanges on its outer and inner faces forming a deep peripheral groove between them, and an outer portion or felly of cast metal cast into said groove and made of greater width than the space between the flanges whereby it is seated against the hub not only at the bottom of said groove but also against the peripheries of said flanges.

10. A car-wheel constructed with a wheel-center formed with a solid hub of wrought metal having projecting flanges on its outer and inner faces, forming a peripheral groove between them, and the inner flange of greater diameter than the outer one, and an outer portion or felly of cast metal cast into said groove and bearing against said flanges, whereby the inner flange serves to strengthen the felly against lateral strains.

11. A car-wheel consisting of a removable tire, combined with a wheel-center formed with a solid hub of wrought metal having projecting flanges on its opposite sides, forming a deep peripheral groove between them and undercut on their approaching faces, with a cast-metal outer portion or felly cast into said groove, made with a wide bearing against said flanges, and formed of two inclined webs and an intermediate core.

12. A car wheel and axle provided with reciprocal shoulders at the inner side of the hub to prevent the displacement of the wheel inwardly along the axle, combined with a key seated in the hub and axle to prevent the twisting of the wheel on the axle.

13. A car wheel and axle, combined with a headed key seated in the axle and hub, with its head abutting against the inner end of its keyway in the axle and receiving the abutment of the wheel-hub, whereby the wheel is kept from turning on the axle and its displacement inwardly along the axle is prevented.

14. A car wheel and axle, combined with a spring-key seated in a keyway in the axle, with its outer end abutting against the end of said keyway and its head bearing against the outer side of the hub.

15. A car-wheel having an inclined notch in its bore and a radial recess in its outer face, combined with an axle having a coinciding keyway, and a spring-key seated in said keyway with its head bridging said notch and lying in said recess.

16. The combination, with a car-wheel, of a thrust-washer secured removably to the face of its hub and projecting beyond the latter to receive the thrust.

17. The combination, with a car-wheel, of a thrust-washer of anti-friction metal secured to the face of its hub and projecting beyond the latter to receive the thrust.

18. The combination, with a car-wheel, of a thrust-washer having bosses entering sockets in the hub and fastened by screws entering through said bosses and countersunk therein beneath the plane to which the washer is to be worn down.

19. The combination, with a car-wheel, of a thrust-washer having bosses entering sockets in the hub and countersunk recesses for the screw-heads in said bosses, and divided into two portions, in order that it may be put around the axle, the line of division passing diametrically through said bosses, in order that the same screw may fasten both halves.

20. The combination, with a car-wheel, of a thrust-washer secured to the face of its hub, and constructed in two parts hinged together, in order that it may be put around the axle.

In witness whereof I have hereunto signed my name in the presence of two subscribing witnesses.

JAMES N. WEIKLY.

Witnesses:
ARTHUR C. FRASER,
WILLIAM H. HANNAM.